United States Patent
Cho

(10) Patent No.: US 8,131,918 B2
(45) Date of Patent: Mar. 6, 2012

(54) METHOD AND TERMINAL FOR DEMAND PAGING AT LEAST ONE OF CODE AND DATA REQUIRING REAL-TIME RESPONSE

(75) Inventor: Jung-Min Cho, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 685 days.

(21) Appl. No.: 12/260,879

(22) Filed: Oct. 29, 2008

(65) Prior Publication Data

US 2009/0138655 A1 May 28, 2009

(30) Foreign Application Priority Data

Nov. 23, 2007 (KR) .................. 10-2007-0120352

(51) Int. Cl.
*G06F 12/00* (2006.01)
(52) U.S. Cl. .................. 711/104; 711/103; 711/E12.001
(58) Field of Classification Search .................. 711/103, 711/104, E12.001
See application file for complete search history.

(56) References Cited

U.S. PATENT DOCUMENTS

| 2005/0005076 A1* | 1/2005 | Lasser ........................... 711/154 |
| 2005/0160217 A1* | 7/2005 | Gonzalez et al. .................. 711/6 |
| 2005/0235119 A1* | 10/2005 | Sechrest et al. ............... 711/158 |
| 2007/0245097 A1* | 10/2007 | Gschwind et al. ............ 711/154 |
| 2008/0114923 A1* | 5/2008 | In et al. ......................... 711/103 |
| 2009/0249015 A1* | 10/2009 | Tzeng ........................... 711/165 |

* cited by examiner

*Primary Examiner* — Kevin Ellis
*Assistant Examiner* — Mehdi Namazi
(74) *Attorney, Agent, or Firm* — Jefferson IP Law, LLP

(57) ABSTRACT

A method and terminal for demand paging at least one of code and data requiring a real-time response is provided. The method includes splitting and compressing at least one of code and data requiring a real-time response to a size of a paging buffer and storing the compressed at least one of code and data in a physical storage medium, if there is a request for demand paging for the at least one of code and data requiring the real-time response, classifying the at least one of code and data requiring the real-time response as an object of Random Access Memory (RAM) paging that pages from the physical storage medium to a paging buffer, and loading the classified at least one of code and data into the paging buffer.

20 Claims, 5 Drawing Sheets

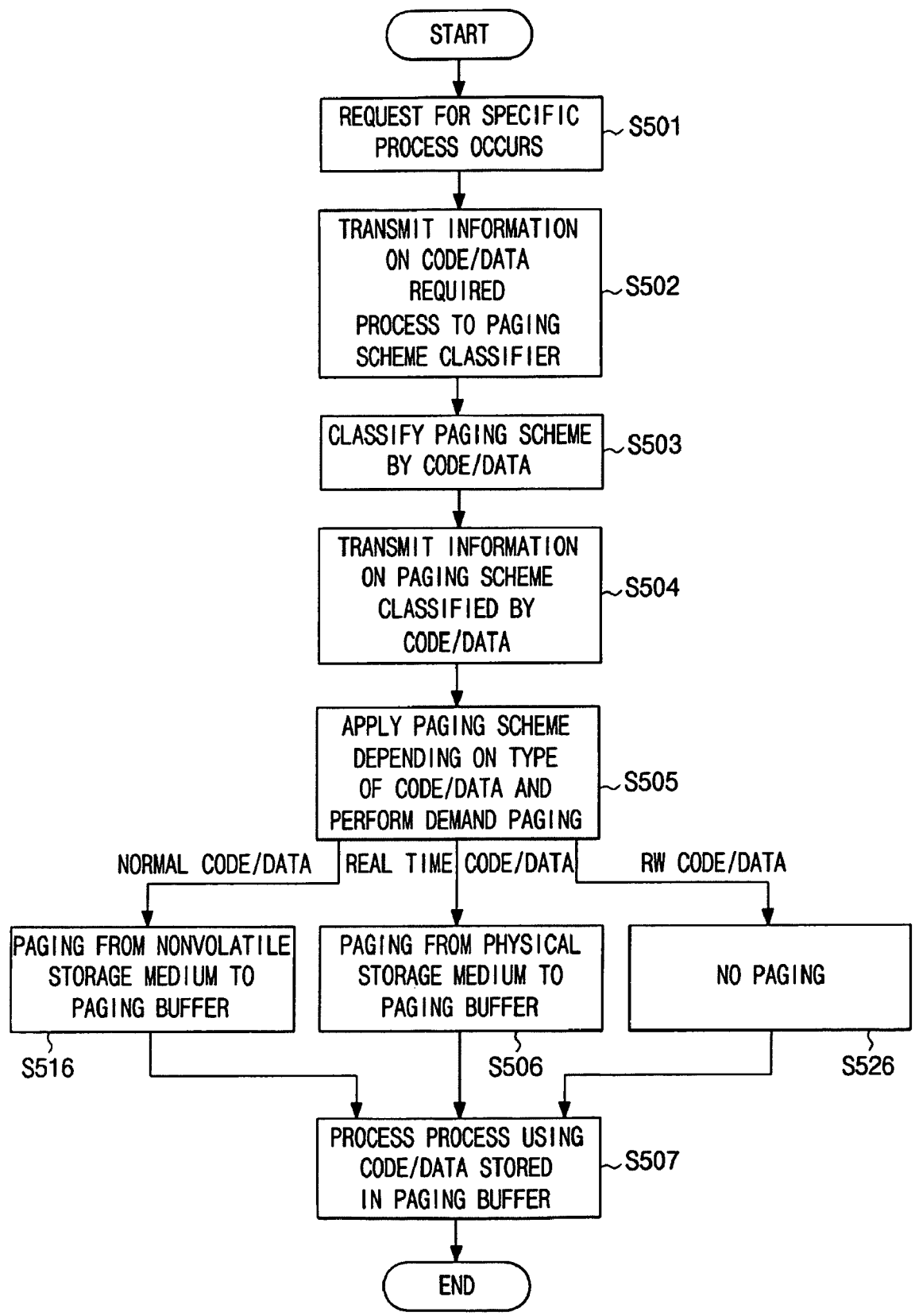

METHOD AND TERMINAL FOR DEMAND PAGING AT LEAST ONE OF CODE AND DATA REQUIRING REAL-TIME RESPONSE

PRIORITY

This application claims the benefit under 35 U.S.C. §119 (a) of a Korean patent application filed in the Korean Intellectual Property Office on Nov. 23, 2007 and assigned Serial No. 2007-0120352, the entire disclosure of which is hereby incorporated by reference.

BACKGROUND OF THE INVENTION

1. Field of the Invention

The present invention relates to a demand paging technique. More particularly, the present invention relates to a demand paging method and terminal for processing at least one of code and data requiring a real-time response through the efficient use of a limited capacity of Random Access Memory (RAM).

2. Description of the Related Art

All devices store data, which can be either data related to characteristics of a device or executable code required for the execution of functions of a device. Devices use a virtual memory technique to efficiently store and manage data.

In the virtual memory technique, a physical storage medium (a volatile storage medium) and a nonvolatile storage medium are mapped to manage data and code and demand paging is performed to retrieve only data that is needed. Demand paging is a method for reading only data that is required for a specific process from the nonvolatile storage medium, temporarily downloading the data to the physical storage medium, and reading the data from the physical storage medium. In the execution of demand paging, the only information read is information that is required for a process and for rapidly processing the information in a high speed RAM. Then, after a preset period of time lapses, information temporarily stored in a RAM is deleted. In other words, demand paging refers to a memory management technique for storing data of the device in a physical storage medium and for reading only part of the data from the physical storage medium whenever it is needed.

The nonvolatile storage medium of the device stores executable code and data provided from several sources. However, the code and data stored in the nonvolatile storage medium are not all used in a process that is executed during a specific period of time. Among the code, there may be a code necessary for only a specific case, for example, only when a process starts or an event occurs. Thus, it is inefficient to load the entirety of the code, which may not all be required, into the physical storage medium. Further, if the procedure is repeatedly executed each time a process within the device needs to be carried out, this may waste resources of the device. Accordingly, only necessary information is loaded into the physical storage medium at a specific time point using the demand paging technique.

With the development of mobile equipment, more functions are gradually added to the mobile equipment to realize a more convenient mobile environment. Adding more functions to the mobile equipment requires an increase in the amount of software or a demand for RAM. This is followed by an increase in an amount of RAM needed in a device. However, RAM is a relatively expensive resource.

In recent years, a demand for cheap equipment is also increasing at the same time. Thus, in order to meet the two conflicting requirements, RAM has to be more efficiently used in order to enable a lesser amount of RAM to be needed.

In a general environment such as a Personal Computer (PC), which is not the mobile environment, the above requirements are satisfied using a virtual memory technique. In the virtual memory technique, disk resources that are slower but much cheaper than RAM are virtualized as if they were RAM and the contents of a disk are mapped to a partial buffer of a RAM and used whenever they are needed. Only part of the code stored in the disk is required to process a specific process. Thus, the virtual memory technique shifts only content needed at a specific time point from the disk to the RAM and performs a process, thereby enhancing a degree of use of the RAM.

In the mobile environment, a Not AND (NAND) flash memory functions as a disk of the mobile equipment. The NAND flash memory, a type of a nonvolatile storage medium, can store a large capacity of data despite its simple structure. The NAND flash memory also has an advantage of excellent durability, large capacity, and relatively low cost as compared to a magnetic storage device.

However, with the NAND flash memory, write performance is comparatively slower than a read performance and frequent writes shorten its operational life and therefore, it is difficult for the mobile environment to utilize the virtual memory technique of the general PC environment. Thus, mobile equipment primarily applies a demand paging technique of caching only data, such as code that is in read only region, having no change in the content of RAM.

A virtual memory used in the general PC environment has changeable content. Thus, when the content is no longer needed in a caching buffer, changed content is rewritten to a disk so that the changed content can be henceforth referred to according to need. The mobile equipment performs demand paging for only unchangeable data (that is, read only data) and therefore, does not have to swap out content to the NAND flash memory, etc.

FIG. 1 is a flow diagram illustrating a conventional demand paging process.

In the case where a terminal intends to carry out a specific process, the terminal reads data stored in a flash memory.

Initially, the terminal secures a memory space in a RAM to store read data therein in step S101. Then, the terminal determines whether data to be loaded corresponds to read only data in step S102.

The read only data, an object of demand paging, is stored in a flash memory. On the other hand, data other than the read only data are all loaded into the RAM because they cannot be demand-paged.

Thus, if data corresponds to the read only data, the terminal takes the data from the flash memory through demand paging and temporarily stores the data in RAM in step S103.

On the other hand, the data other than the read only data are not objects of demand paging and thus, the terminal copies the data, which have been loaded into RAM, into a cashing buffer and temporarily stores the data in the cashing buffer in step S104.

Then, the terminal processes a specific process using the loaded data in step S105.

Thus, the demand paging technique provides an advantage of being capable of greatly reducing a needed capacity of RAM for code execution because an amount of RAM used for code execution can be reduced by a size of the caching buffer from a size of all of the code.

Demand paging is a technology suitable for use in mobile equipment requiring a strict real-time response that would not be tolerant to a delay of even 1 ms, because the demand paging has no write operation that would take a long time.

However, in the case where a NAND flash memory is used together with data storage, there is a problem. In the case where there is a request for demand paging while a file system performs write/erase for a NAND flash memory that is a shared resource in a mobile equipment operating in a multi-task mode, the demand paging has to wait until the file system finishes using the NAND flash memory. However, it takes a period of time on the order of several milliseconds (ms) for a storage type flash medium such as a conventional NAND flash to perform an erase, etc. and therefore, this causes a delay.

Because a delay of several ms cannot be tolerated in a protocol stack such as a phone function, even when there is a request for demand paging, it is determined whether the demand paging is applied by strictly separating code requiring a real-time response and a code that does not. However, this separation process requires a lot of effort and technology and further, it is difficult to distinguish the code in many cases. Thus, a considerable amount of code is classified as not being able to apply demand paging in order to ensure stability. The code classified as not being able to apply the demand paging are all loaded into RAM and therefore, there is a drawback of consuming a large amount of RAM resources.

SUMMARY OF THE INVENTION

An aspect of the present invention is to address at least the above-mentioned problems and/or disadvantages and to provide at least the advantages described below. Accordingly, an aspect of the present invention is to provide a method and terminal for efficient use of a limited capacity of RAM by reducing an amount of use of the RAM that is required to execute at least one of code and data requiring a strict real-time response.

According to an aspect of the invention, a method of demand paging is provided. The method includes procedures of splitting and compressing at least one of code and data requiring a real-time response to a size of a paging buffer and storing the compressed at least one of code and data in a physical storage medium, if there is a request for demand paging for the at least one of code and data requiring the real-time response, classifying the at least one of code and data requiring the real-time response as an object of Random Access Memory (RAM) paging that pages from the physical storage medium to a paging buffer, and loading the classified at least one of code and data into the paging buffer.

According to another aspect of the invention, a terminal of performing demand paging is provided. The terminal includes a central processing unit for splitting and compressing at least one of code and data, which requires a real-time response and is classified as an object of Random Access Memory (RAM) paging, and for loading the compressed at least one of code and data into a physical storage medium, the physical storage medium for storing the at least one of code and data, classified as the object of RAM paging, in a split and compressed format, and for comprising a paging buffer for temporarily storing the at least one of code and data loaded through demand paging, and a paging processing unit for loading the at least one of code and data, which is stored in the physical storage medium, into the paging buffer if there is a request for demand paging for the at least one of code and data classified as the object of RAM paging.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 5 is a flow diagram illustrating a process of demand paging for at least one of code and data requiring a real-time response according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. The following description illustrates exemplary embodiments of a method and a terminal of demand paging for at least one of code and data requiring a real-time response.

Figure 1:
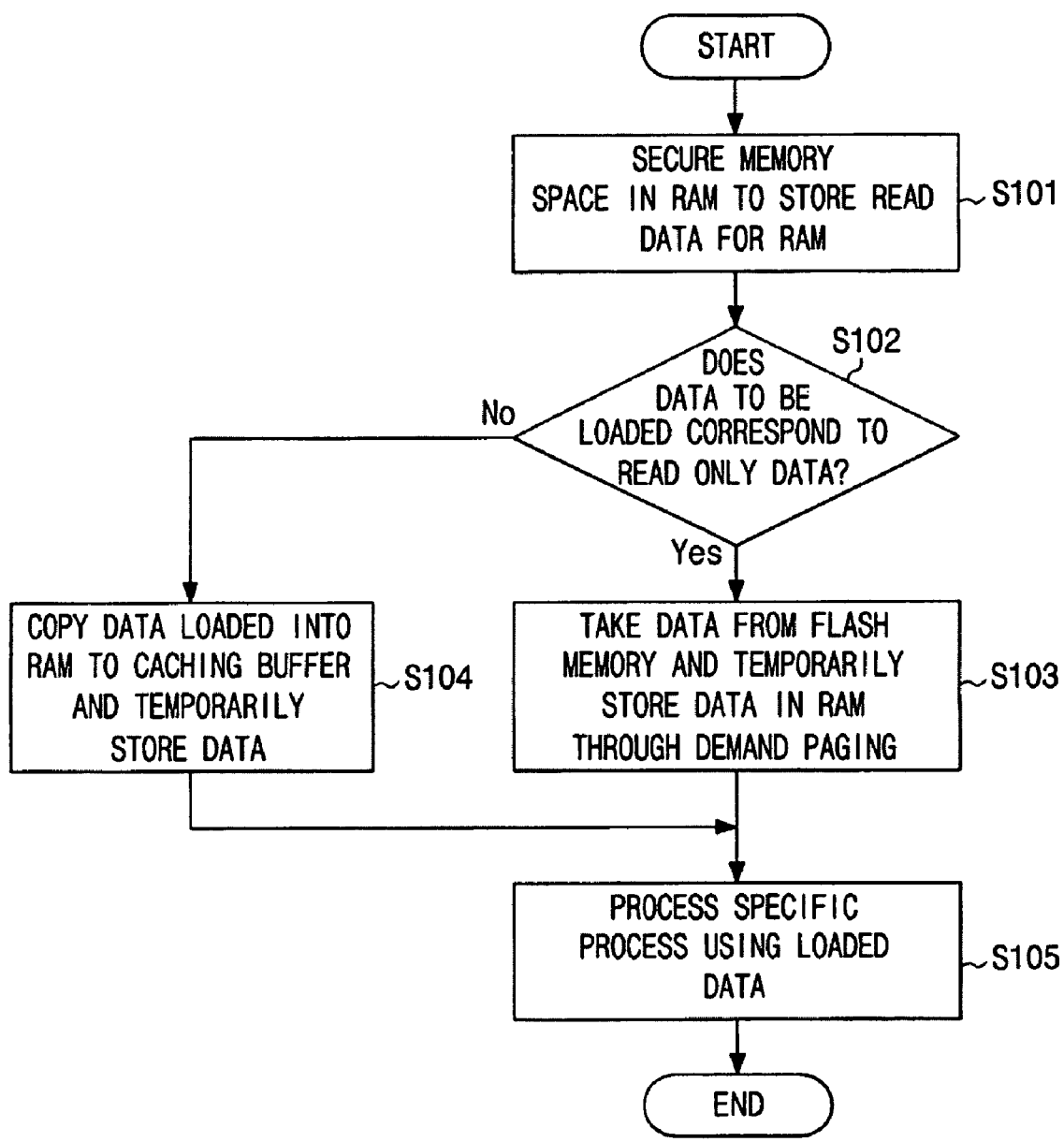
FIG. 1 is a flow diagram illustrating a conventional demand paging process.
Figure 2:
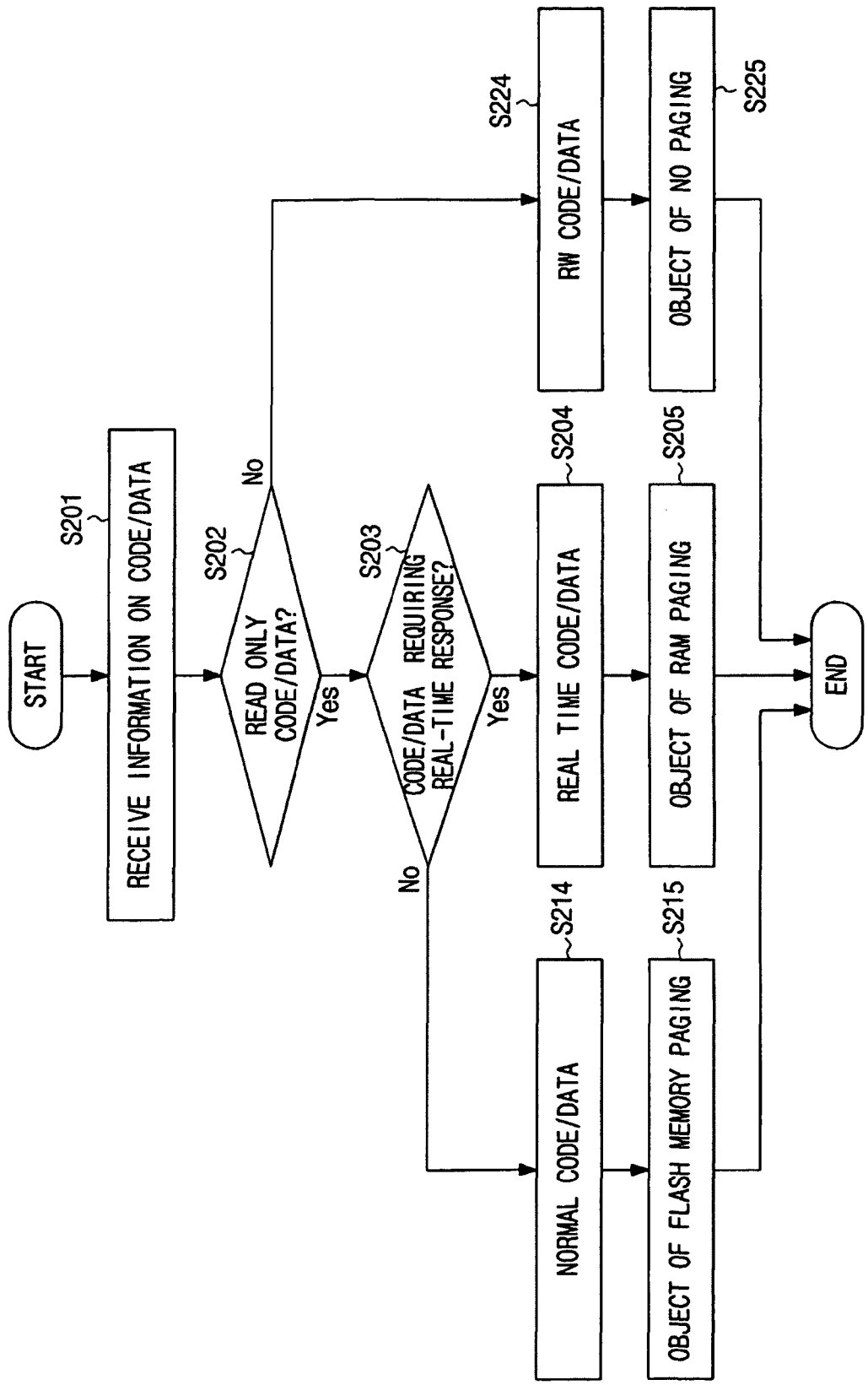
FIG. 2 is a flow diagram illustrating a process of classifying a paging scheme to be applied based on at least one of code and data according to an exemplary embodiment of the present invention.

FIG. 2 is a flow diagram illustrating a process of classifying a paging scheme to be applied based on at least one of code and data according to an exemplary embodiment of the present invention.

In the exemplary embodiments of the present invention, the paging scheme is different depending on a type of at least one of data and code.

First, at least one of code and data requiring a real-time response is paged in RAM. A demand paging technique is applied to this at least one of code and data according to an exemplary embodiment of the present invention. This at least one of code and data may be referred to as a "real-time at least one of code and data" in the description of the exemplary embodiments of the present invention.

Second, at least one of code and data not requiring a real-time response is paged in a flash memory. That is, this at least one of code and data is demand paged according to a conventional paging scheme. This at least one of code and data may be referred to as a "normal at least one of code and data" in the description of the exemplary embodiments of the present invention.

Third, at least one of code and data other than read only at least one of code and data cannot be paged and therefore, is loaded into a RAM. This at least one of code and data may be referred to as "Read/Write (RW) at least one of code and data" in the description of the exemplary embodiments of the present invention.

Henceforth, a scheme of performing a paging in a nonvolatile storage medium as in a conventional demand-paging scheme may be referred to as "flash memory paging" in the description of the exemplary embodiments of the present invention. A scheme of performing a paging in a physical storage medium may be referred to as "RAM paging" in the description of the exemplary embodiments of the present invention.

Figure 3:
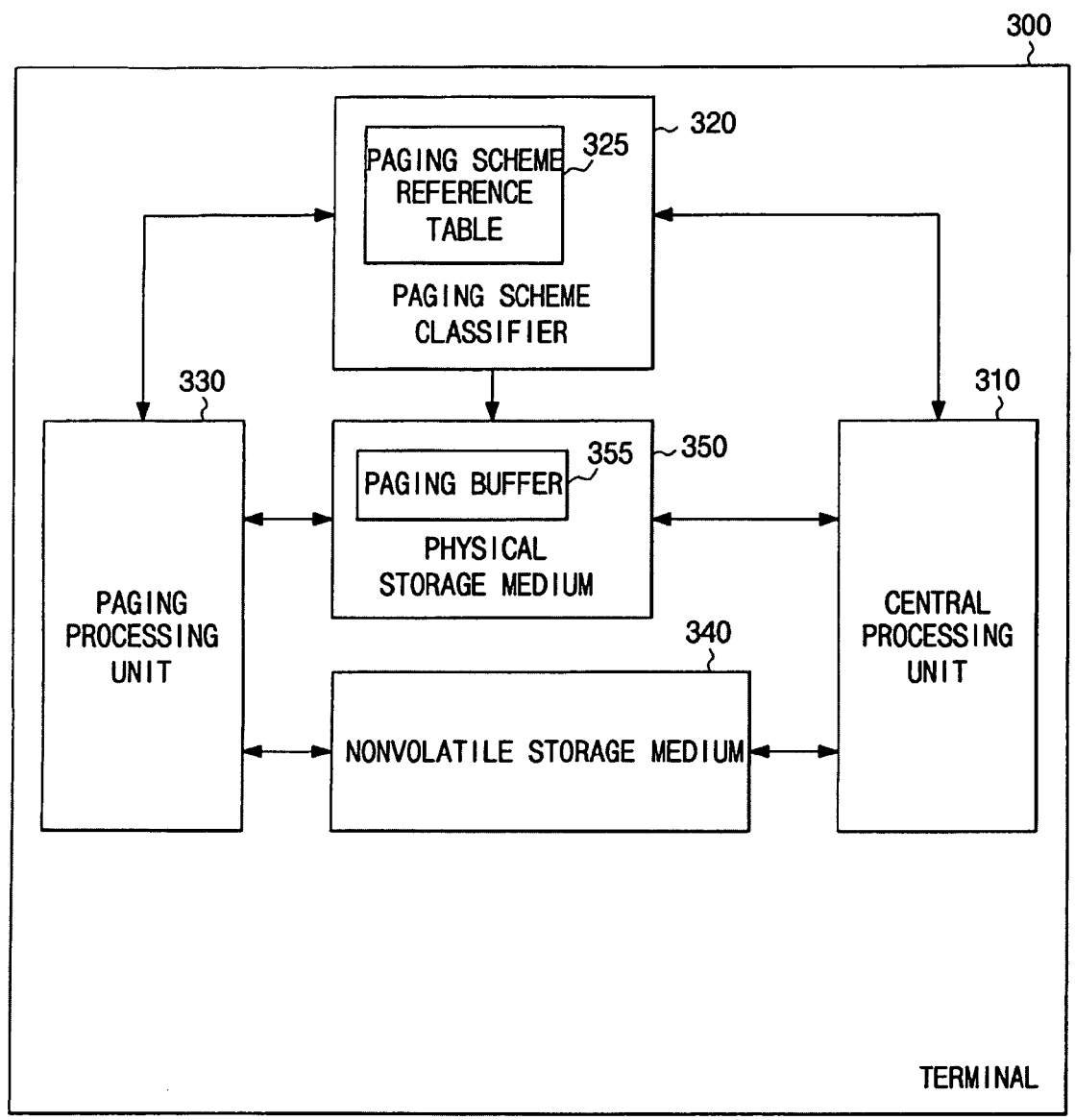
FIG. 3 is a block diagram illustrating a construction of a terminal performing demand paging for at least one of code and data requiring a real-time response according to an exemplary embodiment of the present invention.

Referring to FIG. 2, when a specific process is processed, a central processing unit (310 of FIG. 3) of a terminal (300 of FIG. 3) transmits at least one of code and data, which are required to process the process, to a paging scheme classifier (320 of FIG. 3). The paging scheme classifier 320 receives information on the at least one of code and data in step S201 and classifies a paging scheme depending on the received information.

The paging scheme classifier 320 determines whether the at least one of code and data is read only at least one of code and data in step S202. Only unchangeable at least one of code and data (that is, read only at least one of code and data) is subjected to demand paging according to an exemplary embodiment of the present invention. If the at least one of code and data is not read only at least one of code and data, changed content has to again be swapped out to a nonvolatile storage medium (340 of FIG. 3). Thus, if the at least one of code and data is not read only at least one of code and data, the paging scheme classifier 320 classifies the at least one of code and data as ReWritable (RW) at least one of code and data in step S224. The RW at least one of code and data does not apply demand paging. Thus, the paging scheme classifier 320 classifies the RW at least one of code and data as an object of no paging in step S225.

If the at least one of code and data is read only at least one of code and data in step S202, the paging scheme classifier 320 determines whether the at least one of code and data is at least one of code and data requiring a real-time response in step S203. If the at least one of code and data is at least one of code and data requiring a real-time response, the paging scheme classifier 320 classifies the at least one of code and data as real-time at least one of code and data in step S204. Then, the paging scheme classifier 320 classifies the real-time at least one of code and data as an object of RAM paging in step S205.

If the at least one of code and data is not at least one of code and data requiring the real-time response in step S203, the paging scheme classifier 320 classifies the at least one of code and data as normal at least one of code and data in step S214. Then, the paging scheme classifier 320 classifies the normal at least one of code and data as an object of flash memory paging in step S215.

Further, if the paging scheme classifier 320 cannot determine whether the at least one of code and data is at least one of code and data requiring a real-time response, it can also classify the at least one of code and data as the at least one of code and data requiring a real-time response in order to ensure stability.

FIG. 3 is a block diagram illustrating a construction of a terminal performing demand paging for at least one of code and data requiring a real-time response according to an exemplary embodiment of the present invention.

The terminal 300 includes a central processing unit 310, a paging scheme classifier 320, a paging processing unit 330, a nonvolatile storage medium 340, and a physical storage medium 350. The paging scheme classifier 320 includes a paging scheme reference table 325. The physical storage medium 350 includes a paging buffer 355.

The central processing unit 310 loads at least one of code and data classified as an object of RAM paging and at least one of code and data classified as an object of no paging into the physical storage medium 350 while a mobile equipment is booted. In this case, the central processing unit 310 can refer to the paging scheme reference table 325 described later. The central processing unit 310 splits, compresses, and loads the at least one of code and data classified as an object of RAM paging and loads the at least one of code and data classified as an object of no paging as it is without splitting and compressing. This is described later in detail with reference to FIG. 4.

In the case where the terminal 300 intends to process a specific process, the central processing unit 310 transmits information on at least one of code and data required for the process to the paging scheme classifier 320. The paging scheme classifier 320 classifies a paging scheme depending on the at least one of code and data and transmits information on the paging scheme to the paging processing unit 330. The paging processing unit 330 performs demand paging in the paging scheme depending on the type of the at least one of code and data. If the paging processing unit 330 loads the at least one of code and data into the physical storage medium 350 through the demand paging, and the central processing unit 310 carries out the process using the loaded at least one of code and data.

The paging scheme classifier 320 classifies the paging scheme to apply depending on the at least one of code and data. In detail, the paging scheme classifier 320 classifies the at least one of code and data received from the central processing unit 310 as a real-time at least one of code and data, a normal at least one of code and data, and RW at least one of code and data, respectively, and classifies the real-time at least one of code and data as an object of RAM paging, the normal at least one of code and data as an object of flash memory paging, and the RW at least one of code and data as an object of no paging, respectively. The paging scheme classifier 320 sends information on the paging scheme for the at least one of code and data to the paging processing unit 330. A classification process of the paging scheme classifier 320 has been already described above with reference to FIG. 2.

The paging scheme classifier 320 can include the paging scheme reference table 325 that comprises an entry arranging a corresponding paging scheme based on at least one of code and data.

The paging processing unit 330 performs the demand paging with reference to the information on the paging scheme for the at least one of code and data that is received from the paging scheme classifier 320. When performing the demand paging, the paging processing unit 330 loads only the at last one of code and data that is needed among the at least one of code and data stored in the nonvolatile storage medium 340 or the physical storage medium 350, into the physical storage medium 350. The paging processing unit 330 may perform the demand paging in accordance with the two paging schemes described below.

In the first scheme, a real-time at least one of code and data that is an object of RAM paging is paged into the paging buffer 355 in a state where it is compressed and stored in the physical storage medium 350.

In the second scheme, a normal at least one of code and data that is an object of flash memory paging is paged into the paging buffer 355 in a state where it is stored in the nonvolatile storage medium 340.

Operation of the paging processing unit 330 will be described later in more detail with reference to FIG. 5.

The nonvolatile storage medium 340 and the physical storage medium 350 store at last one of executable code and data. The nonvolatile storage medium 340 can maintain stored information despite not being supplied with power and can use the stored information when power is supplied. The nonvolatile storage medium 340 can be any of a flash memory, a Read Only Memory (ROM), a magnetic tape, a magnetic disk, etc. Herein, for the purpose of explanation, the nonvolatile storage medium 340 will be described as being flash memory in exemplary embodiments of the present invention. However, the description of the nonvolatile storage medium 340 being flash memory is merely an example and it is not intended to limit the scope of the present invention.

The physical storage medium 350 is a volatile storage medium. Conventionally, RAM is used as the physical storage medium 350. Unlike the nonvolatile storage medium 340, content stored in RAM erases when power is no longer supplied thereto. However, RAM provides high-speed write/read compared to the nonvolatile storage medium 340 and therefore, can quickly process a process by taking only at least one of code and data that is required to process the process.

The nonvolatile storage medium 340 stores a normal at least one of code and data that is an object of flash memory paging.

The physical storage medium 350 stores a real-time at least one of code and data that is an object of RAM paging and RW at least one of code and data that is an object of no paging. The real-time at least one of code and data and the RW at least one of code and data have been loaded by the central processing unit 310 when the mobile equipment is booted. Though being described later, the real-time at least one of code and data is split, compressed, and stored in the physical storage medium 350 to increase the effectiveness of an exemplary embodiment of the present invention. However, the RW at least one of code and data is compressed as one unit without being split and stored in the physical storage medium 350.

The paging buffer 355 is included in the physical storage medium 350. If the paging processing unit 330 reads the real-time at least one of code and data that is split, compressed and stored in the physical storage medium 350 by performing the demand paging, the paging buffer 355 stores the real-time at least one of code and data.

In exemplary embodiments of the present invention, read only at least one of code and data is demand paged. That is, the read only at least one of code and data is demand paged to the paging buffer 355 in a state where it is compressed and stored in the physical storage medium 350, unlike a conventional method where it is demand paged in the nonvolatile storage medium 340.

The conventional demand paging method has a problem in that, upon erase/write, a delay can take place because the nonvolatile storage medium 340 is used as a shared resource. In order to eliminate such a delay, a method of direct accessing in the physical storage medium 350 causing no delay is employed in place of the conventional demand paging method where the demand paging is performed in the nonvolatile storage medium 340.

Basically, the physical storage medium 350 is a region having no need for paging. Therefore, execution of RAM paging results in an additional waste of buffer capacity. Thus, the RAM paging is meaningful only when at least one of code and data that is an object of paging is necessarily compressed, thus reducing the existing demand for the physical storage medium 350.

Figure 4:
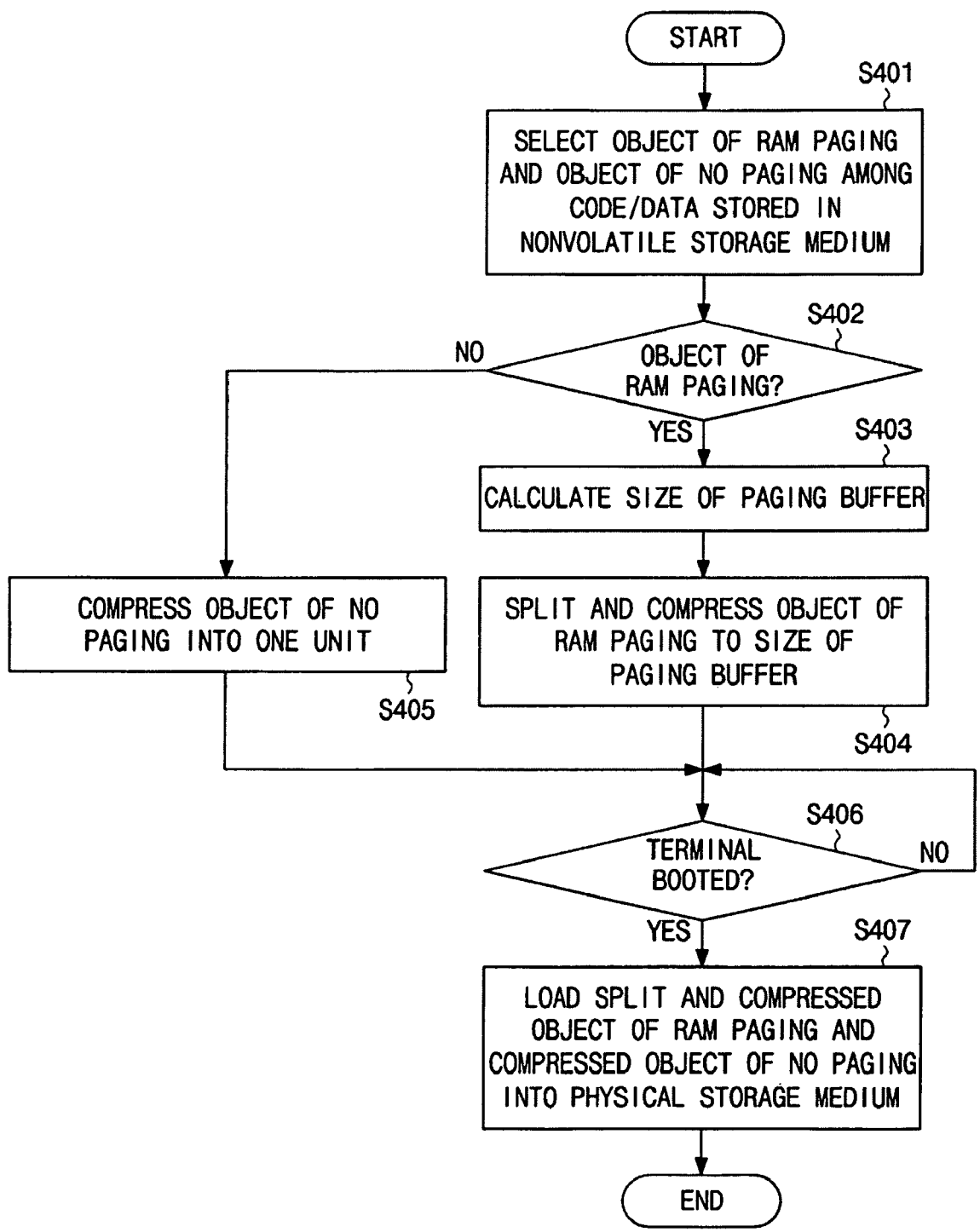
FIG. 4 is a flow diagram illustrating a process of splitting, compressing, and storing at least one of code and data in a physical storage medium to perform demand paging according to an exemplary embodiment of the present invention.

FIG. 4 is a flow diagram illustrating a process of splitting, compressing, and storing at least one of code and data in a physical storage medium to perform demand paging according to an exemplary embodiment of the present invention.

In a conventional compression method, the entire RAM paging region is compressed in one unit. This requires the use of a large temporary buffer and an additional amount of time due to decompression because the entire RAM paging region has to be decompressed every time paging is required. In contrast, in demand paging, a quantity of a buffer necessary for paging, once implemented, is only about a few Kbytes. Thus, it is very inefficient to compress the entire RAM paging region in one unit in the conventional compression method.

In exemplary embodiments of the present invention, a RAM paging region is split and compressed into a size of the paging buffer 355 and is loaded into the physical storage medium 350 such that, upon demand paging, decompression and paging can be performed in only a small unit that is adapted to the size of the paging buffer 355.

The central processing unit 310 selects at least one of a code and data stored in the nonvolatile storage medium 340 as an object of RAM paging and an object of no paging with reference to the paging scheme reference table 325 in step S401.

Then, the central processing unit 310 processes the object of RAM paging and the object of no paging in a different scheme. Accordingly, the central processing unit 310 first has to determine if the selected at least one of code and data is the object of RAM paging or not in step S402.

If the at least one of code and data is the object of RAM paging, the central processing unit 310 splits and compresses the object of RAM paging into the size of the paging buffer 355. For this, the central processing unit 310 calculates the size of the paging buffer 355 in step S403 and splits and compresses the object of RAM paging to the size of the paging buffer 355 in step S404. For example, assuming that the object of RAM paging has a size of 15 MB, the paging buffer has a size of 3 MB, and a compression rate is equal to 40%. In this case, the object of RAM paging can be split and compressed as two pieces to be fit into 3 MB that is the size of the paging buffer since the object of RAM paging has a size of 6 MB (15 MB×0.4=6 MB) when compressed. That is, the object of RAM paging is split and compressed by 7.5 MB.

If the at least one of code and data is the object of no paging, the central processing unit 310 compresses the entirety of the at least one of code and data into one unit in step S405.

Then, the central processing unit 310 determines whether a terminal 300 is booted in step S406. If the terminal 300 is booted, the central processing unit 310 loads the object of RAM paging and the object of no paging into the physical storage medium 350 in step S407. If the terminal 300 is not booted, the central processing unit 310 repeatedly performs the step S406.

A map having an address of each split compression page is written before a split compression region can be used. Accordingly, a position and capacity where necessary at least one of code and data have been compressed can be determined. Therefore, a necessary capacity can be quickly secured accurately in a necessary position, thus making paging possible.

FIG. 5 is a flow diagram illustrating a process of demand paging for at least one of code and data requiring a real-time response according to an exemplary embodiment of the present invention.

In FIG. 4, a process of splitting and compressing a real-time at least one of code and data classified as an object that cannot apply flash memory paging and, while the terminal 300 is booted, loading the compressed at least one of code and data into the physical storage medium 350 in a split and compressed format as has been previously described. In FIG. 5, a subsequent demand paging process is described.

Code execution, use, etc. cannot be performed in a compressed state. Thus, at least one of code and data has to be decompressed and then copied to the paging buffer 355 for use every time the use of the at least one of code and data is required. The paging buffer 355 can share and use a flash paging buffer that has been used for conventional demand paging and therefore, does not require an additional paging buffer 355.

In the case where the terminal 300 intends to process a specific process in step S501, the central processing unit 310 transmits information on at least one of code and data required to process the process to the paging scheme classifier 320 in step S502.

The paging scheme classifier 320 classifies a paging scheme by at least one of code and data received in step S503. In detail, the paging scheme classifier 320 classifies the at least one of code and data as a real-time code, a normal code, and a RW data. The real-time at least one of code and data, the normal at least one of code and data, and the RW at least one of code and data are classified as an object of RAM paging, an object of flash memory paging, and an object of no paging, respectively. The paging scheme classifier 320 sends information on the paging scheme, which is classified by at least one of code and data, to the paging processing unit 330 in step S504.

The paging processing unit 330 performs demand paging by applying the paging scheme based on the type of the at least one of code and data in step S505.

The paging processing unit 330 pages the real-time at least one of code and data to the paging buffer 355 from the physical storage medium 350 where the real-time at least one of code and data is split and compressed in step S506.

The paging processing unit 330 pages the normal at least one of code and data to the paging buffer 355 from the nonvolatile storage medium 340 in step S516.

The paging processing unit 330 performs no paging for the RW at least one of code and data in step S526.

The paging buffer 355 temporarily stores the real-time at least one of code and data or the normal at least one of code and data that the paging processing unit 330 has read through demand paging. Then, the central processing unit 310 processes the process using the at least one of code and data stored in the paging buffer 355 in step S507. Next, the demand paging process according to an exemplary embodiment of the present invention is terminated.

As described above, the exemplary embodiments of the present invention can reduce an amount of RAM used through demand paging for at least one of code and data that would not have been subject to paging in the conventional art. Demand paging in a flash memory needs only a caching buffer without a need for at least one of code and data to be uploaded into RAM and therefore, can reduce the use of RAM by the entire size of the at least one of code and data applied as an object. Unlike this, RAM compression paging has to upload data of a compressed format into a RAM and therefore, can reduce an amount of RAM used by an efficiency of compression of a corresponding region.

In the cases where an execution binary is split and compressed using a presently known compression algorithm, a space savings of about 40% may be achieved. On the above assumption, a binary having a real-time at least one of code and data of about 15 MB can save an additional 6 MB (15 MB×0.4) of RAM.

At present, a RAM size of a few MB is greatly substantial in embedded equipment. More particularly, even through a little more RAM may be needed than is currently available, it is not desirable to use a larger capacity of RAM because this would increase the cost. Under this circumstance, exemplary embodiments of the present invention can provide an effect of suppressing a cost increase caused corresponding to a quantity of RAM needed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of demand paging, the method comprising:
    splitting and compressing at least one of code and data requiring a real-time response to a size of a paging buffer and storing the compressed at least one of code and data in a physical storage medium;
    if there is a request for demand paging for the at least one of code and data requiring the real-time response, classifying the at least one of code and data requiring the real-time response as an object of Random Access Memory (RAM) paging that pages from the physical storage medium to a paging buffer; and
    loading the classified at least one of code and data into the paging buffer.

2. The method of claim 1, wherein, when a terminal is booted, the at least one of code and data is split and compressed to the size of the paging buffer and is stored in the physical storage medium.

3. The method of claim 1, wherein, if there is a request for demand paging for at least one of code and data not requiring a real-time response, the at least one of code and data not requiring the real-time response is classified as an object of flash memory paging that pages from a nonvolatile storage medium to the physical storage medium.

4. The method of claim 3, wherein the at least one of code and data classified as the object of flash memory paging is loaded from the nonvolatile storage medium to the paging buffer.

5. The method of claim 3, wherein the nonvolatile storage medium is a flash memory.

6. The method of claim 1, wherein, if there is the demand paging for the at least one of code and data requiring the real-time response, the at least one of code and data loaded into the paging buffer is decompressed and used.

7. The method of claim 1, wherein, if at least one of code and data is not read only at least one of code and data, the at least one of code and data is classified as an object of no paging and demand paging is not performed.

8. The method of claim 1, further comprising: processing a specific process using at least one of code and data temporarily stored in the paging buffer.

9. The method of claim 1, further comprising calculating the size of the paging buffer.

10. The method of claim 1, wherein the physical storage medium is a RAM.

11. A terminal of performing demand paging, the terminal comprising:
    a central processing unit for splitting and compressing at least one of code and data, which requires a real-time response and is classified as an object of Random Access Memory (RAM) paging, and for loading the compressed at least one of code and data into a physical storage medium;

the physical storage medium for storing the at least one of code and data, classified as the object of RAM paging, in a split and compressed format, and for comprising a paging buffer for temporarily storing the at least one of code and data loaded through demand paging; and a paging processing unit for loading the at least one of code and data, which is stored in the physical storage medium, into the paging buffer if there is a request for demand paging for the at least one of code and data classified as the object of RAM paging.

12. The terminal of claim 11, further comprising: a paging scheme classifier for classifying a paging scheme to apply depending on specific at least one of code and data and transmitting information on the paging scheme to the paging processing unit.

13. The terminal of claim 12, wherein the paging scheme classifier classifies at least one of code and data requiring a real-time response as an object of RAM paging, at least one of code and data not requiring a real-time response as an object of flash memory paging, and at least one of code and data that is not read only at least one of code and data as an object of no paging.

14. The terminal of claim 13, wherein the paging processing unit performs paging from a nonvolatile storage medium to the paging buffer for the object of flash memory paging.

15. The terminal of claim 11, further comprising: a nonvolatile storage medium for storing at least one of code and data not requiring a real-time response that is an object of flash memory paging.

16. The terminal of claim 15, wherein the nonvolatile storage medium is a flash memory.

17. The terminal of claim 11, wherein, when the terminal is booted, the central processing unit splits and compresses the at least one of code and data classified as the object of RAM paging into a size of the paging buffer and loads the compressed at least one of code and data into the physical storage medium.

18. The terminal of claim 17, wherein the central processing unit calculates the size of the paging buffer.

19. The terminal of claim 11, wherein if the paging processing unit performs demand paging and stores at least one of code and data into the paging buffer, the central processing unit processes a process using the at least one of code and data.

20. The terminal of claim 11, wherein the physical storage medium is a RAM.

* * * * *